(12) United States Patent
Estur et al.

(10) Patent No.: US 10,940,612 B2
(45) Date of Patent: Mar. 9, 2021

(54) POLYAMIDE BEADS AND METHOD FOR THE PRODUCTION THEREOF

(71) Applicants: PERFORMANCE POLYAMIDES SAS, Paris (FR); GALA INDUSTRIES, INC., Eagle Rock, VA (US)

(72) Inventors: Jean-Francois Estur, Saint-Genis Laval (FR); Eric Roche, Luzinay (FR); Michael Eloo, Xanten (DE); Berthold Druschel, Rees (DE)

(73) Assignees: Performance Polyamides S.A.S., Paris (FR); Gala Industries. Inc., Eagle Rock, VA (US)

( * ) Notice: Subject to any disclaimer, the term of this patent is extended or adjusted under 35 U.S.C. 154(b) by 0 days.

(21) Appl. No.: 16/261,734

(22) Filed: Jan. 30, 2019

(65) Prior Publication Data
US 2019/0152096 A1   May 23, 2019

Related U.S. Application Data

(60) Division of application No. 15/589,498, filed on May 8, 2017, now abandoned, which is a continuation of application No. 14/557,033, filed on Dec. 1, 2014, now Pat. No. 9,676,121, which is a continuation of application No. 12/520,584, filed as application No. PCT/EP2007/064364 on Dec. 20, 2007, now abandoned.

(30) Foreign Application Priority Data

Dec. 22, 2006 (FR) ........................ 0611260

(51) Int. Cl.
| | |
|---|---|
| *B29B 9/06* | (2006.01) |
| *B29B 9/12* | (2006.01) |
| *C08G 69/26* | (2006.01) |
| *C08J 3/12* | (2006.01) |
| *C08K 3/34* | (2006.01) |
| *C09K 8/80* | (2006.01) |
| *B29B 9/14* | (2006.01) |
| *B29K 77/00* | (2006.01) |
| *B29L 31/00* | (2006.01) |

(52) U.S. Cl.
CPC ............ *B29B 9/065* (2013.01); *B29B 9/12* (2013.01); *B29B 9/14* (2013.01); *C08G 69/26* (2013.01); *C08J 3/12* (2013.01); *C08K 3/34* (2013.01); *C09K 8/80* (2013.01); *B29B 2009/125* (2013.01); *B29K 2077/00* (2013.01); *B29L 2031/772* (2013.01); *C08J 2377/06* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 2,918,701 A | 12/1959 | Hull et al. | |
| 3,659,651 A | 5/1972 | Graham | |
| 3,749,539 A | 7/1973 | Galbreath et al. | |
| 4,863,646 A | 9/1989 | Watanabe et al. | |
| 5,135,991 A | 8/1992 | Suzuki | |
| 5,244,984 A | 9/1993 | Suzuki | |
| 6,232,436 B1 * | 5/2001 | Beck ................. | B29B 9/065 528/480 |
| 6,562,940 B2 * | 5/2003 | Kuhn .................. | C08G 69/04 525/419 |
| 6,592,350 B1 * | 7/2003 | Chszaniecki ........ | B29B 9/06 425/311 |
| 7,128,118 B2 | 10/2006 | Kramer et al. | |
| 2002/0115818 A1 | 8/2002 | Ogo et al. | |
| 2005/0035483 A1 | 2/2005 | Jackson et al. | |
| 2000/6006539 | 3/2006 | Brannon et al. | |
| 2006/0151170 A1 | 7/2006 | Brannon et al. | |
| 2007/0209795 A1 | 9/2007 | Gupta | |
| 2008/0119589 A1 * | 5/2008 | Majewski ........... | C08L 55/00 524/35 |
| 2008/0248278 A1 * | 10/2008 | Fisher ................. | B32B 5/02 428/304.4 |
| 2017/0259474 A1 * | 9/2017 | Holmes ............... | C08J 9/142 |

FOREIGN PATENT DOCUMENTS

| | | |
|---|---|---|
| EP | 0040080 A2 | 11/1981 |
| EP | 0866088 B1 | 9/1988 |
| FR | 1577285 A | 8/1969 |
| FR | 2642079 A1 | 7/1990 |

* cited by examiner

*Primary Examiner* — Jeffrey D Washville
(74) *Attorney, Agent, or Firm* — Armstrong Teasdale LLP

(57) ABSTRACT

Certain polyamide beads or granules are useful as a sustaining material for underground natural or artificial cracks of the earth's crust essentially employed for the extraction of hydrocarbons such as crude oil or natural gas; such polyamide beads have a spherical or ellipsoidal shape and have a surface free of concave portions, advantageously having a uniform shape, and having a mean diameter lower than or equal to 1.7 mm and a porosity lower than 0.1 ml/g, and are produced using a particular cutting device/extruder.

13 Claims, No Drawings

POLYAMIDE BEADS AND METHOD FOR THE PRODUCTION THEREOF

This application is a divisional of U.S. patent application Ser. No. 15/589,498, filed May 8, 2017, which is a continuation of U.S. patent application Ser. No. 14/557,033, filed Dec. 1, 2014, now patented as U.S. Pat. No. 9,676,121, issued Jul. 13, 2017, which is a continuation of U.S. patent application Ser. No. 12/520,584, filed Jul. 30, 2010, now abandoned, which is a national phase of PCT/EP2007/064364, filed Dec. 20, 2007, designating the United States (published in French on Jul. 3, 2008, as WO 2008/077895 A1), which claims priority under 35 U.S.C. § 119 from FR 0611260, filed Dec. 22, 2006, each hereby expressly incorporated by reference in its entirety and each assigned to the assignee thereof.

The present invention relates to polyamide beads or granules and to a method of manufacturing these beads and also to their use as a proppant for natural or artificial underground cracks of the earth's crust used, in particular, for extracting hydrocarbons such as oil or natural gas.

It relates more particularly to small-diameter beads having a uniform shape.

Thermoplastic polymers such as polyamides are very important materials for the manufacture of numerous articles used in numerous fields. These articles are generally obtained by shaping starting from the molten polymer in spinning, extrusion or molding processes for example.

Generally, the raw material used for producing these articles, especially for supplying the shaping installations, is in the form of polymer granules obtained by casting of the molten polymer exiting polymerization installations in rod form and cutting of these rods into granules of cylindrical shape. These granules generally of cylindrical shape have a length of a few millimeters.

However, for certain applications, it may be advantageous to use granules of a particular shape, for example of substantially spherical shape. Such spherical granules will be referred to hereinbelow as beads, and have, in particular, a better flowability.

For many years, one granulating process makes possible to produce thermoplastic beads. This process and device for implementing it are known as an "underwater pelletizing" device or process and are described, for example, in Patents U.S. Pat. Nos. 2,918,701 or 3,749,539.

The use of this process is tricky, especially for manufacturing polymer granules or beads having a high melting point, such as polyamides. This is because, with this type of polymer, the risks of solidification or crystallization of the material in the die holes are high. Thus, if many die holes are blocked by the solidified or crystallized polymer, the installation will have to be stopped in order to unblock them and at least retain an acceptable productivity.

Numerous studies and improvements of the underwater pelletizing installation have been proposed in order to reduce these risks. However, these risks of blocking of the die holes in the "underwater pelletizing" process result in a limit of the field of use, especially for the granulation of polymers having a high melting point such as polyamides. Thus, in order to reduce the risk of blocking of the die holes with polymers having a high melting point such as polyamides, the granules or beads produced have a diameter greater than 2 mm since the size of the die holes must be sufficiently large in order to have a relatively large mass of polymer in the holes that limits the cooling and the solidification of the material present in the hole.

However, certain applications or uses of thermoplastic polymer beads require beads of small size or diameter, especially the use of polyamide beads as a proppant for natural or artificial underground cracks of the earth's crust in installations for extracting hydrocarbons as described in Patent US 2006/0151170 for example.

One of the objectives of the present invention is to provide small-size polyamide beads and a method that uses an underwater pelletizing device that makes it possible to produce such beads without the drawbacks of the known installations and methods.

For this purpose, the invention provides polyamide beads of spherical or ellipsoidal shape, the surface of which does not comprise concave portions, advantageously of uniform shape, characterized in that they have an average diameter less than or equal to 1.7 mm and a porosity of less than 0.1 ml/g, measured according to the mercury porosity measurement method using a MICROMERITICS AutoPore IV mercury porosimeter according to the standard ASTM Standards of catalysts D 4284-83.

According to the invention, the average diameter D is understood to be the diameter determined by the measurement of the mass P of a random sample of 100 beads. The diameter D is given by the following formula (I):

$$D = [(P \cdot 6)/(100 \cdot Mv \cdot \Pi)]^{1/3} \quad (I)$$

in which:
P represents the mass in grams of a sample of 100 beads or granules; and
Mv represents the density of the material forming the beads.

The density Mv is determined according to the following method:

The volume of the pearls is estimated by water displacement according to the following protocol:

A volumetric Erlenmeyer flask having a volume suitable for the size of the beads is filled with water up to the brim of the neck, which corresponds to a volume $V_1$ of water. The mass of the flask water assembly is measured, and noted as $M_1$. The water is drained from the flask. The flask is filled with a given mass $m_1$ of beads. The flask is again filled with water up to the brim of the neck. The mass of the flask+water+beads assembly is measured, it is noted as $M_2$. The density of the bead is then calculated by the following formula II:

$$Mv = m_1/(m_1-(M_2-M_1)) \cdot V_0 \quad (II)$$

in which $V_0$ represents the density of the water in g/cm³.

The beads of the invention have a uniform shape that does not have any concave portions. This feature is understood to mean that the imaginary envelope of the bead does not comprise any concave portions. However, without going outside the scope of the invention, the surface of the bead may comprise small protuberances or small cavities that form irregularities on the surface the bead such as the defects generated by gas bubbles for example.

The beads of the invention are obtained from a polyamide resin or from a material comprising, as a polymeric matrix, a polyamide resin and fillers or additives.

The polyamide resins and materials suitable for the invention advantageously have high mechanical properties and a high chemical resistance, advantageously compatible for the use of the beads as proppants in hydrocarbon extraction wells.

According to the invention, the polyamide resin used for manufacturing beads is chosen from polyamide thermoplastic polymers having a high melting point, advantageously those that have a melting point above 200° C., such as polyamides 6-6, polyamide 6, copolyamides 66/6, copolyamides 6/66, copolyamides comprising at least 80% by weight of polyamide 6 units, or at least 80% of polyamide 66 units, semiaromatic polyamides such as those sold under the tradenames AMODEL or NYLON HTN, polyamide T6, polyamide 4,6.

Advantageously, the materials used comprise a polyamide matrix and reinforcing and/or bulking fillers added to the thermoplastic polymers. The concentration of these reinforcing and/or bulking fillers may vary to a large extent. This concentration is advantageously between 5% and 90% by weight relative to the mass of the final material.

These reinforcing and/or bulking fillers may be chosen from the group comprising fibers such as glass fibers, aramid fibers, ceramic fibers, fibers made of thermosetting material, ceramic or glass beads, mineral fillers in powder form such as clays, kaolin, talc, silica, aluminum, molecular sieves, natural fillers or fibers such as jute fibers, ground coconut fibers or similar fibers.

The materials may also contain additives that modify certain properties such as plasticizers, additives for stabilization to oxidation, heat and/or light stabilizers, pigments, dyes, mattifying agents, flame retardants, crosslinking agents or similar. According to one preferred feature of the invention, the polyamide beads have an average diameter between 0.5 and 1.7 mm, advantageously between 0.8 mm and 1.5 mm, preferably between 0.9 and 1.3 mm.

The polyamide beads described above may be used in numerous applications such as processes for manufacturing molded or injection-molded articles.

These beads may also be used as is as a means of filling, and preferably as means of shoring up underground fractures and cracks that are natural or that are generated artificially in wells for extracting oil and natural gas in particular. Thus, these polyamide beads are driven into the underground cracks by various techniques described, for example, in Patents U.S. Pat. Nos. 3,659,651, 7,128,118, US 2006/0151170, US 2006/0065398.

According to another subject of the invention, the polyamide beads of the invention are produced by a method for manufacturing beads that uses an underwater pelletizing device for cutting a molten polymer.

The underwater pelletizing devices for the manufacture of substantially spherical granules from molten polymer have been known for a long time. By way of example, mention may be made of Patents U.S. Pat. Nos. 2,918,701 and 3,749,539. Furthermore, US 2005/0035483 describes an underwater pelletizing method and device that makes it possible to reduce the problems generated by the supply of polymers having a high melting point and a high crystallization such as polyamides. This is because, with such polymers, the risks of crystallization of the polymer in the die holes are high. This document describes a solution that consists in equipping the die with means for heating the polymer at the die hole. This document describes the manufacture of spherical polyamide granules having a diameter greater than 3 mm corresponding a weight of 100 granules that is between 2.5 and 4.3 g.

The method of the invention consists in implementing conditions for operating and feeding of the underwater pelletizing device that make it possible to obtain beads having an average diameter of less than 1.7 mm with a minimal risk of blocking of the die holes that is compatible with an industrial production of polyamide beads.

The method of the invention consists in introducing the polyamide or a polyamide-based composition into a granulating device having an underwater pelletizer comprising a die provided with holes, the diameter of which is between 0.3 mm and 1.7 mm, the temperature of the cooling liquid is between 70° C. and 100° C. The polyamide or the composition is fed into the die holes under a pressure between 70 bar and 250 bar. According to the invention, on starting the underwater pelletizing process, the feed pressure of the polymer in the die holes is established at at least 80% of its nominal value indicated above in a very short time, less than 5 seconds, preferably less than 3 seconds. Moreover, this pressure is kept substantially stable throughout the granulating process.

According to one preferred mode of the invention and in order to rapidly establish and obtain a feed pressure on starting the granulating process, the feeding of the polyamide or of the composition is carried out by the use, in series, of a single-screw or twin-screw device and of a gear pump. This is because such an arrangement and especially the use of a gear pump makes it possible to feed the molten polyamide into the die holes at a constant throughput which is advantageously between 3 and 15 kg per hole per hour, preferably between 5 and 12 kg per hole per hour. The gear pump is cited by way of example as a device suitable for rapidly establishing a polymer feed pressure on starting the feeding of the molten polymer into the die of the granulating process. However, without going outside the scope of the invention, it is possible to use other means or devices that make it possible to obtain a similar or identical result.

The granulating devices having an underwater pelletizer generally and advantageously comprise a valve between the die and the outlet of the molten polymer feed device, in the present case the outlet of the gear pump. Thus, on starting the installation and during the warm up of the various equipment, the molten polymer exiting the gear pump is directed by said valve toward a recovery container. After stabilization of the temperatures, the valve is actuated in order to feed the die holes with the molten polymer, the cutting device being started simultaneously.

According to yet another feature of the process of the invention, the rotational speed of the knife or cutting device at the submerged surface of the die is determined in order to obtain beads of desired diameter, and is advantageously between 3000 and 6000 rpm. The polyamide beads thus produced are recovered by any known means, especially by centrifugation, settling or filtration. The beads thus recovered are then advantageously dried. They may also be subjected to treatments in order to modify some of their properties such as the improvement of the mechanical properties by a heat treatment or a radiation treatment in order to produce an increase in the molecular weight of the polymer and/or its degree of crosslinking.

Another subject of the present invention is a device for implementing the manufacturing method as mentioned previously, comprising a granulating device having an underwater pelletizer comprising at least:
  one means of cutting, with a die, for die holes having a diameter between 0.3 mm and 1.7 mm;
  one means of feeding, under pressure, the polyamide or polyamide-based composition to the cutting means, the pelletizer, through the die holes, comprising means for controlling the pressure so that the polyamide or polyamide composition is fed into the die with establishment of at least 80% of the nominal feed pressure no later than 5 seconds after the start of the feeding of the die holes with the molten polymer or material; and a fluid circuit comprising means for controlling the temperature of the cooling liquid at a temperature between 70° C. and 100° C.

As explained previously, the feed means preferably comprises a single-screw or twin-screw extruder combined with a gear pump. The feed means advantageously comprises a means for controlling the throughput of the polyamide in the die that makes it possible to obtain a throughput between 3 and 15 kg/h per hole, preferably between 5 and 12 kg/h per hole.

The cutting means preferably comprises a rotating knife driven by a rotary drive at a rotational speed between 3000 and 6000 rpm.

As indicated previously, these beads are suitable to be used as means for propping open underground cracks in the devices and installations for extracting oil or gas.

Specifically, these beads have mechanical properties, especially compressive strength, and also chemical resistance properties that are suitable for this application.

Other advantages and details of the invention will appear more clearly in view of the examples given below, solely by way of illustration.

EXPERIMENTAL SECTION

Example 1

A polyamide of type 66 sold by RHODIA under the tradename STABAMID 27 AE1 has a viscosity index VI equal to 136 (measured at 25° C. in a Hubbelhode type viscosimeter from a solution containing 5 g/l of polymer dissolved in a mixture composed of 90% by weight of formic acid and 10% by weight of water) and a melting point of 263° C. (determined by the DSC method).

This polymer is melted at a temperature of 308° C. using a twin-screw extruder having a diameter of 50 mm sold by Leistriz and is fed into a gear pump sold by Maag. This gear pump feed an underwater pelletizing device sold by GALA under the tradename A5 PAC 6 at a material pressure of 169 bar. The die of this underwater pelletizing device has 32 holes that are 0.8 mm in diameter. The die is heated at a temperature of 345° C. The device comprises a knife holder equipped with 16 blades that turn in the cutting chamber at a speed of 5000 rpm. In this same cutting chamber, water at 76° C. circulates with a flow rate of 22 $m^3$/h. Under these conditions, the method makes it possible to produce, for a polymer throughput in the holes of the die equal to 170 kg/h with a throughput per hole of 5 kg/h, substantially spherical particles having a diameter equivalent to 1.4 mm.

Example 2

A copolyamide 66/6 comprising 40% by weight of kaolin as mineral fillers is melted at a temperature of 329° C. using a twin-screw extruder, having a diameter of 50 mm sold by Leistriz, which feeds a gear pump sold by Maag. This gear pump feeds an underwater pelletizing device identical to that from example 1 under a pressure of 91 bar, pressure observed 3 seconds after the feeding of the polymer into the die. The die of this underwater pelletizer has 72 holes of 1.2 mm and is heated at a temperature of 369° C. A knife holder equipped with 16 blades turns in the cutting chamber at a speed of 4500 rpm. In this same cutting chamber water at 89° C. circulates at a flow rate of 11 $m^3$/h. Under these conditions, for an extrusion throughput of 420 kg/h, substantially spherical particles are obtained having a diameter equivalent to 1.5 mm.

Example 3

A copolyamide 6/66 comprising 40% mineral filler constituted by kaolin is melted at a temperature of 333° C. using a twin-screw extruder identical to that from examples 1 and 2, which feeds a gear pump identical to that from examples 1 or 2. This gear pump feeds an underwater pelletizing device identical to that from example 1 or 2 under a feed pressure of 135 bar. The die of this underwater pelletizing device has 80 holes of 1 mm in diameter and is heated at a temperature of 389° C. A knife holder equipped with 16 blades turns in the cutting chamber at a speed of 5000 rpm. In this same cutting chamber, water at 92° C. circulates at a flow rate of 20 $m^3$/h. Under these conditions, for an extrusion throughout of 400 kg/h, particles are obtained having a diameter equivalent to 1.25 mm.

The invention claimed is:

1. An apparatus for the production of polyamide beads, the apparatus comprising a granulating device including an underwater pelletizer which comprises:
   one means of cutting;
   a die comprising die holes having a diameter from 0.3 mm to 1.7 mm;
   one means for feeding, wherein the means of feeding comprises a single-screw or twin-screw extruder combined with a gear pump, at a nominal feed pressure ranging from 70 bar to 250 bar, a polyamide or polyamide-based composition to the cutting means through the die holes, including means for controlling the pressure such that the polyamide or polyamide-based composition is fed into the die holes with establishment of at least 80% of the nominal feed pressure no later than 5 seconds after the start of the feeding of the die holes with thus molten polyamide or polyamide-based composition; and
   a fluid circuit comprising means for controlling a temperature of a cooling liquid at a temperature ranging from 70° C. to 100° C.

2. The apparatus as defined by claim 1, wherein the means of feeding comprises a means for controlling a throughput of the polyamide or polyamide-based composition in the die from 3 kg/h to 15 kg/h per hole.

3. The apparatus as defined by claim 2, wherein the means for controlling the throughput of the polyamide or polyamide-based composition controls the throughput of the polyamide or polyamide-based composition in the die from 5 kg/h to 12 kg/h per hole.

4. The apparatus as defined by claim 1, wherein the means of cutting comprises a rotating knife driven by a rotary drive at a rotational speed of from 3,000 rpm and 6,000 rpm.

5. The apparatus as defined by claim 1, wherein the polyamide beads are of substantially spherical or ellipsoidal shape, a surface of which does not comprise concave portions, having an average diameter less than or equal to 1.7 mm and a porosity measured according to the mercury porosity measurement method of less than 0.1 ml/g.

6. The apparatus as defined by claim 5, wherein the polyamide or polyamide-based composition comprises a reinforcing filler and/or a bulking filler.

7. The apparatus as defined by claim 6, wherein a weight concentration of the reinforcing filler and/or the bulking filler ranges from 5% to 90%, with respect to the total weight of the polyamide or polyamide-based composition.

8. The apparatus as defined by claim 5, wherein the polyamide beads have an average diameter ranging from 0.8 mm to 1.5 mm.

9. The apparatus as defined by claim 8, wherein the polyamide beads have an average diameter ranging from 0.9 mm to 1.3 mm.

10. The apparatus as defined by claim 6, wherein the reinforcing filler and/or the bulking filler is selected from the group consisting of glass fibers, aramid fibers, ceramic fibers, mineral fibers, clays, kaolin, silica, alumina, molecular sieves, glass beads, ceramic beads, fillers and plant fibers.

11. The apparatus as defined by claim 5, wherein the polyamide is selected from the group consisting of polyamide 6, polyamide 6,6, polyamide T6, polyamide 4,6, copolyamides of these polyamides and semi-crystalline semi-aromatic polyamides.

12. The apparatus as defined by claim 11, wherein the polyamide is polyamide 66 or copolyamide 6,6/6.

13. The apparatus as defined by claim 5, wherein the polyamide or polyamide-based composition further comprises additives selected from the group consisting of additives for stabilization to oxidation and to light, pigments, dyes, mattifying agents, flame retardants, plasticizers and crosslinking agents.

\* \* \* \* \*